United States Patent [19]

Phillips

[11] 4,243,926
[45] Jan. 6, 1981

[54] LOAD RESPONSIVE VOLTAGE CONTROLLED MOTOR

[76] Inventor: Charles A. Phillips, Rte. 1, Box 54-B, Ardmore, Tenn. 38449

[21] Appl. No.: 932,672

[22] Filed: Aug. 10, 1978

Related U.S. Application Data

[63] Continuation-in-part of Ser. No. 906,688, May 16, 1978.

[51] Int. Cl.³ .............................................. H02P 5/40
[52] U.S. Cl. .................................... 318/798; 318/812; 318/345 D
[58] Field of Search ............... 318/767, 798, 805, 806, 318/809, 812, 345 D, 345 M

[56] References Cited

U.S. PATENT DOCUMENTS

| | | | |
|---|---|---|---|
| 3,443,188 | 5/1969 | Mortimer | 318/809 X |
| 3,455,118 | 7/1969 | Petranek | 318/345 H |
| 3,596,158 | 7/1971 | Watrous | 318/809 |
| 3,895,275 | 7/1975 | Rostad | 318/798 |
| 4,078,393 | 3/1978 | Wills | 318/806 X |
| 4,093,899 | 6/1978 | Denny | 318/812 X |

Primary Examiner—Gene Z. Rubinson
Attorney, Agent, or Firm—C. A. Phillips

[57] ABSTRACT

A load responsive, voltage control current for an A.C. inductor motor wherein the power leads of a triac are connected in series with the motor of an alternating current source of power, and the gate of the triac is connected through an inductor to the power lead interconnecting between the motor and MT2 terminal of a triac. Additionally, means are provided to couple a resistance device across the inductor which varies inversely in resistance responsive to a signal which is responsive to motor loading.

5 Claims, 9 Drawing Figures

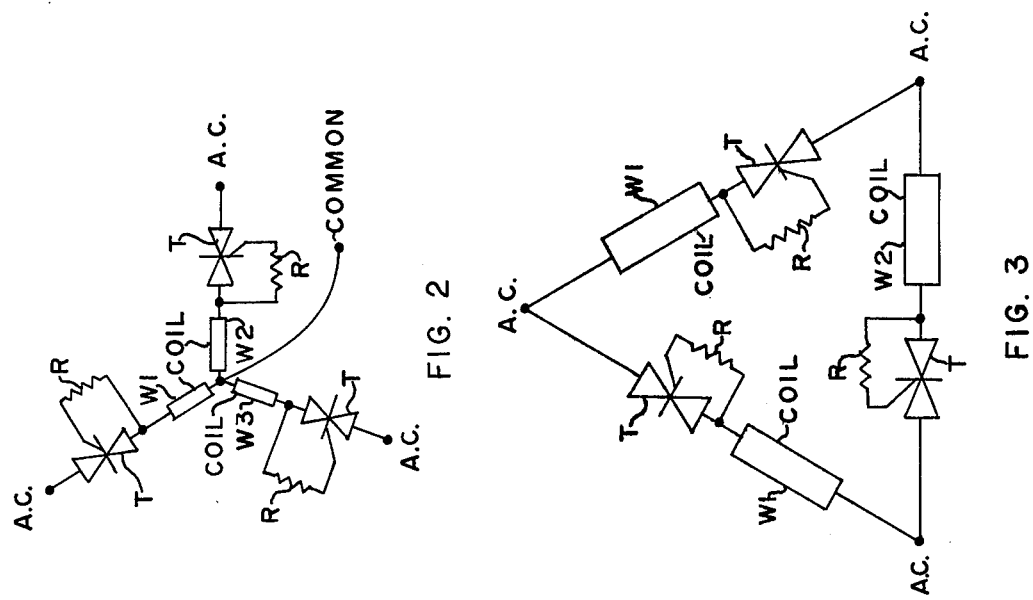

LOAD RESPONSIVE VOLTAGE CONTROLLED MOTOR

This invention is a continuation-in-part of application Ser. No. 906,688, filed May 16, 1978, entitled, "A Load Responsive Voltage Controlled Motor".

BACKGROUND OF THE INVENTION

1. Field of the Invention

This invention relates to devices for controlling power input to motors, and particularly to a motor system wherein the input potential to an A.C. induction motor is controlled proportional to a load on the motor.

2. General Description of the Prior Art

U.S. Pat. No. 4,052,648 describes a system wherein the phase difference between the voltage applied to a motor and current through the motor is detected, and the duty cycle of a triac connected in series with the motor is decreased with an increase in phase angle. By this technique, an unloaded motor is caused to draw less power. In this manner, significant power savings can be achieved inasmuch as many motors operate at times with less than a full load. The system of referenced patent requires a number of components, and it is the object of this invention to provide a motor system wherein both the power input to a motor is decreased with a decreased load, and this is accomplished with fewer components and at less cost.

SUMMARY OF THE INVENTION

In accordance with this invention, the power leads of a triac are connected in series between an A.C. induction motor and a source of alternating current power, such as a source of 60-cycle 120-volt power. Additionally, a voltage dropping, current limiting, impedance is connected between the interconnection of triac power lead and induction motor lead and the gate of the triac, and additionally, where needed, its impedance is varied as an inverse function of motor loading.

While the inventor is not absolutely sure as to the principle of operation of the circuits of this invention, it is known that an unloaded motor provides a quite inductive load and will effect a phase shift wherein the current through the motor may lag with voltage across the motor as much as 80° or so, and accordingly, it appears that by supplying gate current through the motor to the triac, the triac is thus turned on quite late in the duty cycle of applied voltage, and thus substantially reduces the RMS voltage applied to the (unloaded) motor. Then as motor loading is increased, the motor load becomes more resistive (less inductive) and the phase angle decreases. With this effect connected to the gate of the triac, the triac turns on earlier in its applied voltage cycle and as a function of the degree of load, an obviously desired effect. As a second feature of this invention where the above described effect is limited to less than desired by the decrease in signal to the triac by virtue of increased voltage drop across the motor, the impedance coupling the motor gate to the triac would be varied inversely with motor power, current or voltage, and the operating voltage range of the motor may be extended upward as desired. This second feature is also desirable where the impedance is an inductor, and its contribution to phase shift is to be diminished as a function of load current. However, it does appear that by raising the level of the injection current alone (by sufficiently reducing the value of impedance), the triac will fully turn on.

BRIEF DESCRIPTION OF THE DRAWINGS

FIG. 1 is an electrical schematic diagram of an embodiment of the invention.

FIGS. 2 and 3 are schematic diagrams of embodiments of the invention as applied to three phase motors.

DETAILED DESCRIPTION OF THE DRAWINGS

Figure 9:
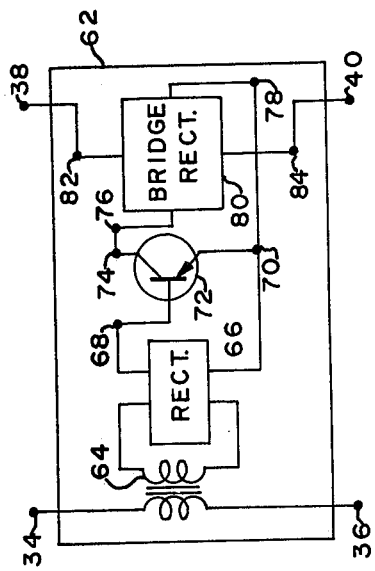
FIGS. 7–9 are electrical schematic diagrams of various forms of signal responsive impedance circuits as contemplated by the invention.

One of the two terminals, terminal 10, of induction motor 12 is connected to A.C. line input terminal 14. The other terminal, terminal 16, of induction motor 12 is connected to load terminal 18 of triac 20. The other load terminal, terminal 22, of triac 20 is connected to terminal 24 of an alternating current line 26. Gate terminal 28 of triac 20 is connected through variable resistor 30 to terminal 18; thus it is connected between the interconnection of a load terminal of triac 18 and a load terminal of induction motor 12. While a variable resistor is employed, resistor 30 may be a fixed resistor where a selected value for the operating conditions existing is determined. In practice, it has been found that the value of the resistor may be in the general range of 3,000 to 8,000 ohms, although this would depend upon an operating characteristic of the particular triac chosen and the desired minimum, no load, power input to motor 12.

While there has been shown a circuit for a single phase motor, as shown in FIG. 2, by inserting a triac T-resistor R combination in each leg of a three phase Y system employing windings or coils $W_1$, $W_2$, and $W_3$, a three phase motor may be controlled in a like manner. Similarly, as shown in FIG. 3, a triac-resistor combination may be inserted in each of the legs of a delta connected three phase motor to control its output in a like manner.

In all cases, resistor 30 would be set to a desired operating point (or value of resistors R of the three phase configuration shown in FIGS. 2 and 3) where the operating voltage, without load, would be selected for the triac and motor involved. Then, upon the application of a load, it appears that by virtue of the sampling point for the gate electrode of the triac, being between the triac and motor, or winding of a motor, the triac is controlled by an injection current which, being derived from current flow through the motor, is in phase with current through the motor. In which case, since with reduced loading, the current lags the voltage basically proportional to the non-loaded state of the motor involved, the triac is operated with a correspondingly reduced duty cycle which reduces the effective voltage applied to the motor, that is, the duty cycle of the triac is reduced. However, when load is applied to the motor, the current lag decreases, and this in turn increases the duty cycle of the triac and raises the effective voltage applied to the motor. Thus, more power is applied to the motor when the motor is under load than when it is not. In this fashion, a substantial improvement in overall efficiency of motor operation is accomplished, particularly where there are significant variations in motor load.

However, there is one additional situation which tends to be overlooked, and that is that most A.C. motors are wound for 115 volts, or 230 volts, whereas typical power lines provide voltages in the range of 120–125 or 240–250 volts, and thus even when a motor is operated under a normal load, there may be a significant phase shift which, in accordance with the present invention, would be effectively discerned by current sampling, and this voltage brought down to a correct operating voltage, thus generally reducing power input to the motor.

As used herein, the term two terminals of an induction motor is intended to cover terminals of a winding or windings connected to the said two terminals of a motor.

Figure 4:
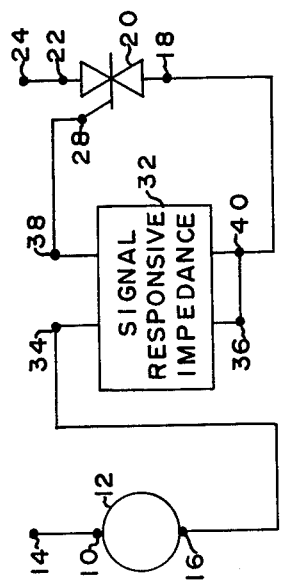
FIGS. 4–6 are electrical schematic diagrams illustrative of a modified form of the invention.

It has been further found that a wider range of response can be effected by varying the impedance of the impedance element through which the triac is supplied, the variation being as an inverse function of power, voltage or current to motor 12. FIG. 4 generally illustrates a system of accomplishing this in which a signal responsive impedance current 32 has an input at terminals 34 and 36 and an output circuit connected at terminals 38 and 40, in turn connected between gate terminal 28 of MT2 triac terminal 18. This impedance circuit reflects across terminals 38 and 40 an impedance which, responsive to motor current, varies inversely with motor current.

Figure 7:
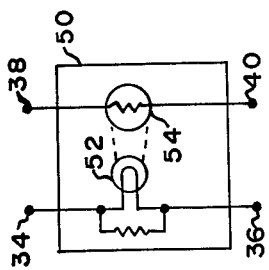
Figure 8:
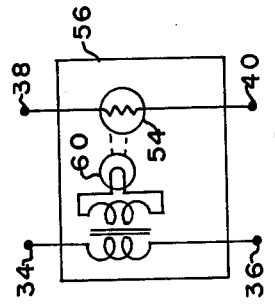

Examples of signal responsive impedance circuits are shown in FIGS. 7, 8, and 9.

Figure 5:
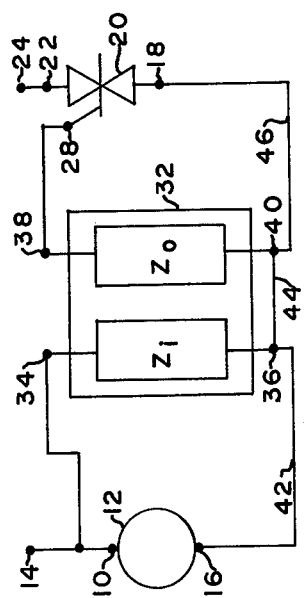

FIG. 5 illustrates an arrangement wherein an impedance input circuit, labelled $Z_i$, is connected through terminals 34 and 36 and across motor terminals 10 and 16. In this illustration, it should be first noted that by virtue of the effect described above with respect to FIGS. 1–3, there will be across motor 12 a voltage which increases with loading irrespective of the presence of signal responsive impedance 32. The role of signal responsive circuit 32 is to enhance this effect which is provided as an output by impedance $Z_o$ connected between terminals 38 and 40, in turn connected between triac gate terminal 28 and terminal 36, which is connected through a small input impedance $Z_i$ to terminal 16 of motor 12. In a most simple form, $Z_i$ would include an incandescent light and $Z_o$ a photoresistive device and an inductor connected in parallel with it. Typically, circuit values would be chosen so that when load current has reached a selected value for full motor current load rating, the motor input voltage would have been raised to a rated input voltage. It often happens that this will occur at a point where the motor voltage (e.g., 110 volts) is less than the actual supply voltage (e.g., 120 volts) available, and thus less power will actually be applied to the motor than would ordinarily be the case for full load, effecting a power savings for even fully loaded, or nearly fully loaded, motors.

Thus, as motor current increases responsive to an increased load, two things appear to occur, both beneficial. First, since the A.C. gating current is obtained through motor 12, it advances in phase as the motor load and current increase and become less inductive (this produces the effect described above with respect to the embodiment illustrated in FIGS. 1–3 which will operate gate 28 to produce about a 60%–70% increase in motor load). Second, the gating signal current, which normally tends to decrease because of an increased voltage drop across motor 12 (and imposes a limit on increase in the 60%–70% range), is compensated for by a responsive drop in impedance of $Z_o$, enabling the gating current to stay sufficiently high to effect gating of triac 20 at progressively earlier points in the duty cycle of the supply voltage as motor current, responsive to motor load, increases. In this fashion, it is, for example, possible to achieve an operating condition wherein with a 120-volt power source and ½-horsepower induction motor, approximately 60 volts at 3 amps would be applied to the motor operating at a minimum or no load condition. When, for example, an increasing load is applied to the motor, there will occur a proportional increase in RMS voltage applied to a motor (with proportional increase in current) up to essentially power line value (there will be a small drop across the triac), and thus there is effected approximately 100% increase in applied voltage with load. This provides an optimum power input to the motor.

Figure 6:
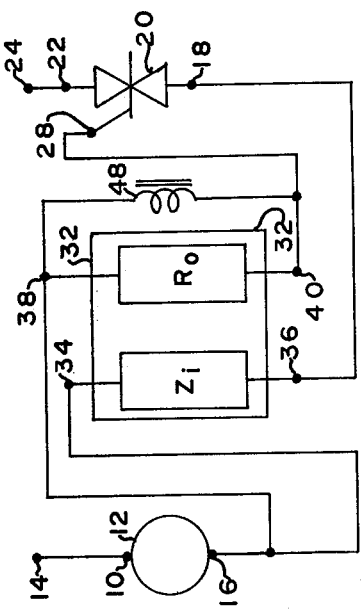

FIG. 6 illustrates an embodiment of the invention wherein inductor 48 is employed as an impedance in circuit with gating terminal 28 of triac 20. In this case, the inductor may be directly connected to power input terminal 14 and thus bypasses motor 12, but generally it is believed that the preferred approach would be to make the connection as shown. The desired initial (no load) current lag signal to triac 20 is obtained by virtue of the inductance of inductor 48, e.g., an inductor having an inductance of the primary and secondary windings, in series, of a 120-volt to 12-volt (at 250 ma) transformer. Inductor 48 is connected in parallel with a signal responsive output resistance $R_o$ signal responsive impedance circuit. Typically, the inductance value of inductor 48 and maximum resistance value for resistance $R_o$ will be chosen so that triac 20 would be turned on at a sufficiently late point in the A.C. power duty cycle to provide an RMS voltage to motor 12 of approximately one-half normal operating voltage. These components would be further chosen so that responsive to current flow through input impedance $Z_i$, the resistance of $R_o$ would decrease proportional to increased motor current, and accordingly, the inductive reactance presented by inductor 48 would be proportionally damped (made less reactive) by a decreased $R_o$ to thus decrease the phase lag of the signal applied to the gate of triac 20. This would thus increase the duty cycle of triac 20 to achieve the effect described above.

FIG. 7 illustrates an example of a responsive impedance circuit 50 employable in the embodiment of the invention shown in FIG. 6 wherein an incandescent bulb 52 appears as $Z_i$ connected across terminals 34 and 36, and a photoresistive (or photoconductive) type photocell 54 is employed as $R_o$ connected across terminals 38 and 40. This type of non-polarized photocell is chosen as a matter of circuit convenience.

FIG. 8 illustrates a signal responsive impedance circuit 56 similar to the one shown in FIG. 7, but wherein a step-up transformer 58 is connected between a motor circuit and lamp 60, and thus enabling the use of a higher voltage rated bulb and/or smaller voltage drop to be connected in circuit with the motor.

FIG. 9 shows still another form of signal responsive impedance circuit 62, and in this circuit, a transformer 64 provides a stepped-up voltage input to rectifier 66, which in turn provides a D.C. signal to the base-emitter input terminals 68 and 70 of transistor 72. The output terminals of transistor 72, collector terminal 74 and emitter terminal 70 are connected across output terminals 76 and 78 of rectifier 80. Input terminals 82 and 84 of bridge rectifier 80 are connected to terminals 38 and 40 which, in accordance with the circuit of FIG. 6, would be connected across inductor 48. Thus, transistor 72 becomes a variable resistor inversely responsive to current flow through motor 12, and as such resistor, it is connected across rectifier 80, and the resistance is reflected through bridge rectifier 80 across inductor 48. The function of bridge rectifier 80 is to translate a polarized type load as provided by transistor 72 to an A.C. bipolarity load suitable for connection across inductor 48 and in circuit between power terminal 14 and the gate of triac 20. In operation, as current increases through motor 12, the resulting increased voltage input applied to rectifier 66, and then applied by rectifier 66 to the transistor, effects a proportional decrease in resistance in the emitter-collector circuit of transistor 72, which is reflected through bridge rectifier 80 across inductor 48 to effect a decrease in inductive reactance in inductor 48 as a function of motor current. This then effects a proportional advanced firing of triac 20, enabling its duty cycle to be increased proportional to current flow, as needed for an optimum power input to motor 12. Preferably, the output of rectifier 66 is filtered.

Having thus described my invention, what is claimed is:

1. A motor control circuit comprising:
    an alternating current induction motor having at least one winding connected to first and second terminals;
    a triac having first (MT1) and second (MT2) power terminals and a gate terminal;
    a source of alternating current voltage having first and second terminals; and
    a non-capacitive impedance having first and second terminals;
    wherein said first terminals of said triac, motor, and impedance are connected together, said second terminal of said impedance is connected to said gate terminal of said triac, said second terminal of said motor is connected to said first terminal of said source of A.C. power, and said second terminal of said triac is connected to said second terminal of said source of A.C. power, the firing point of said triac being controllable by current flow through the motor and then through said impedance and gate of said triac without the necessity of other, reactive, circuitry coupled to the gate of said triac.

2. A motor control circuit comprising:
    first and second motor power terminals;
    a triac having first and second load terminals and a gate terminal;
    a source of alternating current voltage having first and second terminals;
    said first terminal of said source being connected to said first terminal of said triac;
    said second terminal of said triac being coupled to said first motor power terminal, and said second motor power terminal being connected to said second terminal of said source; and
    signal responsive impedance means including a net inductive reactive impedance coupled between said gate terminal and said first motor power terminal of said source, and including means responsive to a signal coupled in circuit with said motor power terminals for decreasing the impedance of said impedance as a direct function of current through said motor power terminals, and the firing point of said triac being controllable by current flow through said first motor power terminal and then through said inductive impedance and then through said gate of said triac without the necessity of other, reactive, circuitry coupled to the gate of said triac.

3. A motor control circuit as set forth in claim 2 wherein said signal is responsive to voltage across said first and second motor power terminals.

4. A motor control circuit as set forth in claim 2 wherein said impedance includes an inductor and means coupled to said inductor and responsive to current flow through said first and second motor power terminals for decreasing the inductive reactance of said inductor across said inductor as a function of said current flow.

5. A motor control circuit as set forth in claim 1 wherein said signal responsive impedance means includes a source of illumination connected in circuit with said motor and a photoconductive type photocell coupled across said inductor, and said photocell being positioned to receive light from said source of illumination, whereby as said current increases, light received by said photocell increases and its resistance coupled to said inductor decreases, effecting a decreased impedance in circuit with said gate terminal, and thereby an increased duty cycle of said triac.

* * * * *